Oct. 10, 1944.   N. C. STONE   2,360,082
METHOD FOR DETERMINING THE BREAKING TIME OF STRATUS AND FOG
Filed April 21, 1942

Inventor
Newton C. Stone
Lyon & Lyon
By   Attorneys

Patented Oct. 10, 1944

2,360,082

UNITED STATES PATENT OFFICE 2,360,082

METHOD FOR DETERMINING THE BREAKING TIME OF STRATUS AND FOG

Newton C. Stone, Pasadena, Calif., assignor to California Institute Research Foundation, Pasadena, Calif., a corporation of California Application April 21, 1942, Serial No. 439,864

3 Claims. (Cl. 88—14)

This invention relates primarily to a method for forecasting the dissipation of fog and stratus, although it has been and can be used successfully for determining many other meteorological problems confronting our Army, Navy, and United States Weather Bureau air line meteorologists.

The method of the present invention may be employed for measuring either the total incoming insolation or the rate of incoming insolation for any given period of time. The method of the present invention may also be employed to determine whether more than one cloud layer is present. The method of the present invention also enables one to determine the vertical visibility or to make an estimate of the formation time of the stratus or fog. It is definitely understood by all concerned that fog and stratus clouds are one of the most important weather or atmospheric phenomena that must be forecast by our Army, Navy, and United States Weather Bureau meteorologists. It is absolutely necessary that the time of dissipation of fog or stratus be known for the efficient operation of all types of aircraft, as well as for the safe operation of battleships, cruisers, freighters, transport ships, submarines, tanks, armies, civilians, etc. Clouds and fog furnish a natural camouflage which is very important in both defensive and offensive operations. An accurate knowledge of the time of dissipation of fog or stratus is also of importance for many other purposes. At present, we have no method which even approaches a good degree of accuracy for this type of forecast. There are several methods which work well on paper, but when put to the test of actual practice fail due to a lack of necessary data, such as a continuous pressure-temperature curve, temperature-altitude curve, density of cloud layer present, presence of multiple cloud layers, and moreover the breaking time (arbitrarily chosen as a change in the sky condition from overcast or broken to scattered or less) of stratus and fog is dependent upon the specific humidity throughout the entire atmosphere. It is considered by some that our present radiosonde reports are suitable, but this is impossible since the reports are not continuous; and, even if they were, it is very doubtful that at the present time the accuracy of the weather elements reported is sufficient to give even a close approximation to the correct breaking time. I have used the method just mentioned and it proved completely unsatisfactory. There are also employed captive balloons with pressure, temperature, and relative humidity recording devices, but they too are unsatisfactory as well as expensive and cumbersome to operate especially when in enemy territory. There are many other reasons for the failure of present methods in forecasting the breaking time of stratus and fog.

It is a general object of the present invention to provide a method for forecasting the breaking time of stratus or fog. Furthermore, the calculation of the breaking time by the method of the present invention is not dependent on any information that is not available, and by the method of the present invention no time is wasted in getting a forecast issued. The method of the present invention is dependent upon the measurement of the amount or rate, or both, of the insolation actually penetrating this total column of the atmosphere. By taking this one measurement and correlating it with respect to the ceiling (the distance from the surface of the ground or water to the base of the cloud layer), it is possible to determine the breaking time from the tables prepared.

The major factor in the dissipation of fog or stratus in most cases is the heating of the same by insolation, which is an indirect process since absorption of short wave solar radiation by the cloud layers is unimportant. It has been found that the breaking time of fog or stratus may be forecast by a measurement of the integrated amount of insolation reaching the earth's surface during a given period. Therefore, the rate or amount of incoming insolation is a function of not only the density and thickness of the cloud layer or layers, but of the whole column of atmosphere. The short wave solar radiation penetrates this column with very little absorption and then reaches the earth and is re-radiated as long wave terrestrial radiation. First, the temperature of the air under the cloud or fog is raised by a vertical mixing process. The intensity of this process is dependent on the degree of instability under the temperature inversion and the base of the cloud. Second, the air in the cloud must be heated to a point at which the cloud evaporates.

In determining the insolation passing through a fog or stratus, it has been found that a measurement is best made of the region of the radiant energy spectrum, which corresponds to visible light. The transmission of light through a fog or stratus does not follow the formula developed by Lord Rayleigh, which formula indicates that a scattering coefficiency of the light is inversely proportional to the fourth power of wave length.

Such formula is valid only for the transmission of light through a suspension of particles of a diameter small compared with the wave length of light. The particles of a stratus or fog cloud are large compared with the wave length of visible and near infra-red light, and accordingly Lord Rayleigh's formula does not apply. In the case of particles which are of the same order of magnitude as the wave length, or larger, the transmission of light over a path a centimeter in length is $$T = e^{-\pi n r^2 k}$$

in which T=transmission, $e$ is the base of the natural or Neperian system of logarithms, $n=$the number of particles per cubic centimeter, $r=$particles radius in centimeters, $k=$a function of $r/\lambda$ and $\lambda=$the wave length of the light. For $r/\lambda$ greater than about five, $k=1$ and the exponent reduces to the total projected area of the drops.

Thus, in a typical stratus or fog cloud with an average drop radius of 20 microns, the transmission is the same for all wave lengths, less than about 4 microns. The transmission would not become appreciably higher until the wave length was greater than 40 microns. It may, therefore, be concluded that there is no region of the radiant energy spectrum which will penetrate a cloud layer or fog better than visible light, and this has been confirmed by direct measurement. Accordingly, in the process of the present invention, I prefer to employ measurements of the visible light region of the spectrum, that is, that portion of the spectrum having a wave length of about 4500 Angstrom units, or ranging from around 3500 to 6000 Angstrom units.

In the process of the present invention, I measure the insolation coming through the atmosphere which corresponds to the visible light. This insolation may be measured by an apparatus including a photo-electric cell, of any usual or preferred type, except that the photo-electric cell employed in said apparatus is preferably selected to have its peak sensitivity within the range of 3500 to 6000 Angstrom units in order that the same will be principally responsive to the visible light coming through the atmosphere. In measuring the insolation coming through the atmosphere, the photo-electric cell should be placed in a region where the light reaching same comes only from the sky, and the photo-electric cell should be shut off from all shadows and reflected light of objects.

Figure 1:
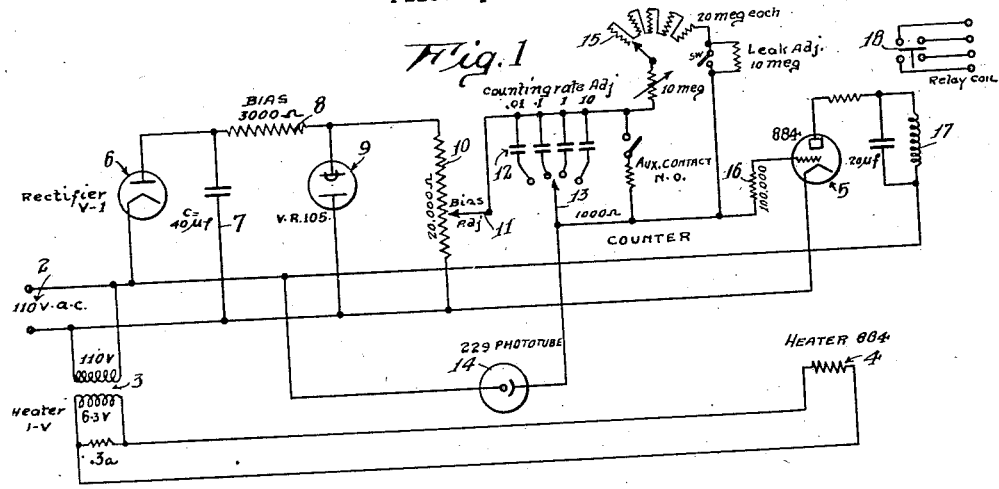
Figure 1 is an electrical diagram of the apparatus employed.

In the drawing, 2 indicates a source of current, such as the ordinary 110 volt mains, which is connected to a transformer 3 for the filament 4 of the gas triode 5. One of the mains 2 is connected through a rectifier 6 to a filter circuit including the condenser 7 and resistor 8 leading to a neon tube 9 shunted by a bias resistor 10. The bias resistor 10 is connected by an adjustable tap 11 to a plurality of condensers 12 adapted to be selectively connected to a tap 13 leading to the photo-cell 14. The photo-cell 14 is selected to be responsive principally in the visible light region, for which purpose I have found a 929 tube satisfactory. Across the condensers 12 is connected a variable resistance 15, which provides means for regulating the charging time of the condensers 12. From the resistor 15 connection is made through pipe resistor 16 to the grid of the gas triode 5, the plate of which is connected to the coil 17 of a relay having moving contacts 18 adapted to close circuits which may lead to any usual or preferred type of counter or register mechanism. With the particular apparatus illustrated the energy output of the photo-tube 14 is automatically recorded. The output of the photo-electric cell serves to charge one of the condensers 12, which in turn controls the bias on the gas triode 5, effecting the discharge of the gas triode upon the accumulation of a predetermined amount of energy in the condenser system 12, which discharge operates the relay 17, simultaneously effecting the discharge of the condenser 12 in the preparation of the apparatus for a subsequent accumulation of energy.

Figure 2:
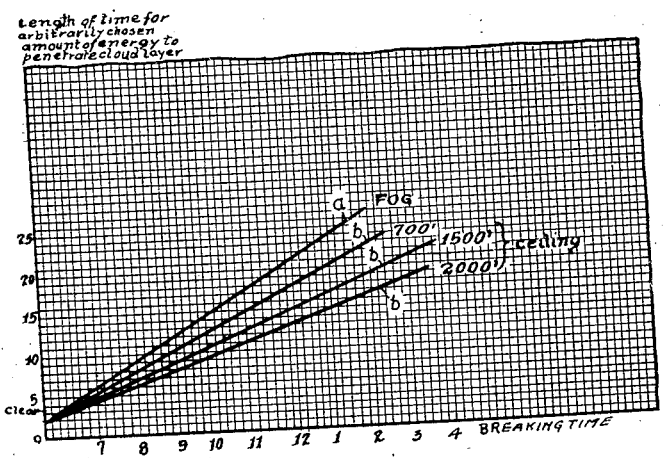
Figure 2 is one form of chart used for predicting the breaking time from the measurments of the apparatus.

In determining the breaking time of fog or stratus with such an apparatus, I prefer to conduct the measurements each day at an exact time, before or after sunrise. A variation of 1 or 2 minutes in making the determinations may cause an error in the forecast of the breaking time. The apparatus may be turned on or off by an electric clock set to turn the apparatus, or at a predetermined time with reference to sunrise, and I prefer to make the determinations at 15 minutes before sunrise. The apparatus may be operated in two different manners; that is, the apparatus may be employed to determine the length of the time for a given quantity of energy to be measured by the apparatus; or the apparatus may be employed to determine the quantity of energy over a fixed period of time. The chart, Figure 2 of the drawing, illustrates the manner of predicting the breaking time of fog or stratus where the time employed for the apparatus to measure a given quantity of energy is utilized. In Figure 2 the vertical ordinant represents the minutes required for the apparatus to measure a predetermined quantity of insolation. The horizontal ordinant represents the time of day at which the stratus or fog through which the insolation is measured can be forecast to break. The line $a$ on the chart is employed for making predictions when the forecast is for a cloud, and the lines $b$ are employed when making a forecast of the breaking time of stratus with the different ceilings indicated. Thus, for example, with the particular apparatus I have employed where the apparatus registered an interval of 17 minutes for the accumulation of a certain quantity of insolation, the breaking time of the fog would be forecast as 10:36 A. M. In case the same measurement was made on a stratus having a 1500 foot ceiling, the breaking time would be forecast as 1 P. M.

The particular chart of Figure 2 is for a particular apparatus and for a particular time of year. Since the insolation reaching the earth varies with the seasons of the year, modifications must be employed in using the chart at different periods of the year. In determining the plot of Figure 2, the apparatus with a given setting should be operated to obtain a sufficient number of observations to construct the lines $a$ and $b$, indicated thereon from the determinations made, after which the apparatus may be subsequently employed for predicting the breaking time.

Figure 3:
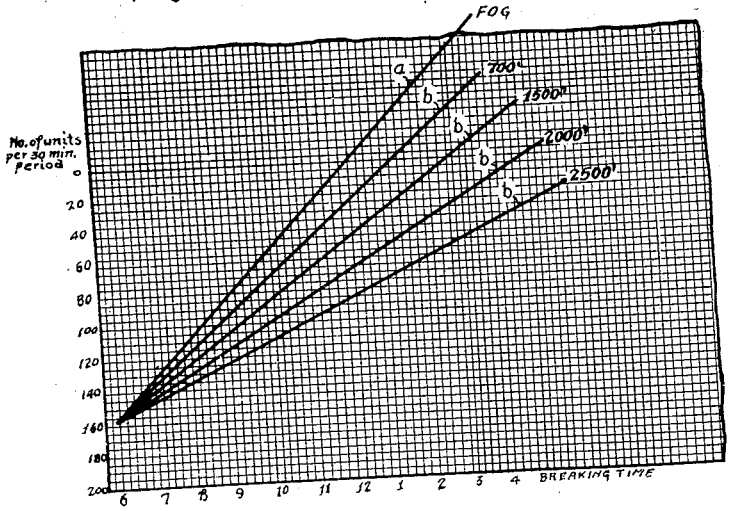
Figure 3 is another form of chart used for predicting the breaking time from the measurements made by the apparatus.

In Figure 3 of the drawing I have indicated a corresponding chart for use with an instrument which is set to register the amount of insolation received over a fixed period of time. Thus, the apparatus of Figure 1 may be turned on by a clock and off again by the clock, after a period of, for example, 5 minutes, and the relay 17 employed to actuate a counter which may be utilized as the measure of energy received. In the plot of Figure 3 the determinations by the counter are indicated as the vertical ordinant, and the lines $a$ and $b$ are again the correct lines to be employed for making prediction either in case of a fog or a stratus having the ceilings indicated. In the case of any particular instrument, such lines must be experimentally determined by securing a number of observations, after which the lines may be constructed and the chart employed with the measurements of insolation for thereafter accurately determining the breaking time of fog or stratus.

While the particular form of the method herein described is well adapted to carry out the objects of the invention, it is to be understood that various modifications may be made, and this invention includes all such modifications as come within the scope of the appended claims.

I claim:

1. A method of determining the breaking time of fog or stratus, which comprises measuring the rate at which solar radiation reaches the earth through said fog or stratus at a predetermined time near sunrise, measuring the ceiling, and thereafter comparing said measured rate with rates previously measured under substantially the same conditions and which correspond to known breaking times.

2. A method of determining the breaking time of fog or stratus, which comprises measuring the rate at which the solar radiation reaches the earth's surface through said fog or stratus at a predetermined time with reference to sunrise, the measurement being carried out so as to be responsive principally to the visible light region of the spectrum, measuring the ceiling, and thereafter comparing said measured rate with rates previously measured under substantially the same conditions and which correspond to known breaking times.

3. A method of determining the breaking time of fog or stratus, which comprises measuring the rate at which the visible solar radiation comes through the atmosphere, said measurement being made at the earth's surface, said measurement being conducted at a predetermined time with reference to sunrise, measuring the ceiling, and comparing the measured rate with rates previously measured under substantially the same conditions and which correspond to known breaking times.

NEWTON C. STONE.